3,355,519
CHLORINATED POLYETHYLENES

Erwin Alfons Müller and Klaus Hoehne, Leverkusen, and Wilhelm Becker, Cologne-Stammheim, Germany, assignors to Farbenfabriken Bayer Aktiengesellschaft, Leverkusen, Germany, a German corporation
No Drawing. Filed July 9, 1963, Ser. No. 293,880
Claims priority, application Germany, July 11, 1962, F 37,284
5 Claims. (Cl. 260—897)

This invention relates to specific chlorinated polyethylenes having excellent film-forming properties as well as a process for producing such chlorinated polyethylenes.

It is known to halogenate ethylene polymers with melting points between 100° and 120° C. and with molecular weights higher than 2000 in solvents resistant to halogen. It is also known that by chlorinating polyethylenes in mixtures of chloroform and a solvent of relatively high boiling point, such as carbon tetrachloride, the chlorination of the ethylene polymers can be carried out from start to finish in a homogeneous solution, and that uniformly chlorinated polyethylenes are obtained in this way. However, the hitherto known chlorinated polyethylenes did not satisfy the industrial conditions required of them, for example in the lacquer industry, as regards their film-forming properties. In the lacquer industry, the former chlorinated polyethylenes had for example too high a film brittleness, or had a poor bonding strength with the support or showed defects in the flow properties, so that films with uneven surfaces were formed.

It has now been found that chlorination products of ethylene or copolymers of ethylene with particularly outstanding film-forming properties, good elasticity and bonding strength, such as are of particular importance for the lacquer industry, can be obtained if mixtures of two polyethylenes of different molecular size (characterised by their intrinsic viscosities) are subjected to chlorination in chlorine-resistant solvents at initial temperatures for the chlorination of at least 60° C.

More particularly, it has been found that mixtures of 90–10 parts of a polyethylene with intrinsic viscosities of $(\eta)=0.1$ to 0.4 (dl./g.) and 10–90 parts of a polyethylene with intrinsic viscosities $(\eta)$ from 0.6 to 1.0 (dl./g.) can be used for this purpose, it being necessary for the intrinsic viscosities of the two polyethylenes to be used to differ from one another by at least 0.4 unit.

For the present process, it is preferred to use mixtures of 70–40 parts of a polyethylene with an intrinsic viscosity between 0.2 and 0.3 (dl./g.) and 30–60 parts of a polyethylene with an intrinsic viscosity between 0.7 and 0.8 (dl./g.).

The chlorination of the aforementioned polyethylene mixtures takes place in chlorine-resistant solvents especially chlorinated hydrocarbons such as carbon tetrachloride, chloroform and chlorobenzene, but advantageously in chloroform or mixtures of the aforesaid solvents. It is preferable for this purpose to use 5 to about 15% and advantageously about 7–10% solutions of the aforesaid polyethylenes in the said solvents inert with respect to chlorination.

The chlorination should take place, at least at the start, at temperatures in the region of 60° C. This temperature is preferably maintained during the further progress of the chlorination. A chlorination in chloroform above its boiling point can be achieved by adding to the chloroform, in suitable proportions those chlorine-resistant solvents of which mixtures with chloroform boil at a higher temperature than the chloroform alone, or by the chlorinating under elevated pressure. For the first-mentioned case, mixtures of chloroform with carbon tetrachloride have proved particularly expedient. The preferred temperature range for the chlorination is between 60 and 100° C., although higher temperatures up to about 200° C. are not to be excluded.

As the chlorination agent within the scope of the present process, it is also possible to use, as well as chlorine, the known agents which split off chlorine, such as sulphonic acid or carboxylic acid amides which are substituted by chlorine on the nitrogen atom. To accelerate the chlorination, it is also possible to use chlorination catalysts of the heavy metal chloride type, such as iron chloride, zinc chloride or aluminium chloride, furthermore iodine or free radical formers such as benzoyl peroxide or azodiisobutyronitrile. These chlorination catalysts are applied in quantities of about 0.1 to 3%, calculated on the total amount of polyethylenes.

The reaction solutions can also be irradiated with light during the chlorination, more especially with light which has a high content of ultra-violet rays. Those agents which combine with the acid by-product formed during chlorination, e.g. sodium carbonate, sodium bicarbonate, sodium acetate, etc., can also be added.

After completing the chlorination, it is expedient for the solutions to be heated briefly to boiling point or for a part of the solvent or solvent mixture to be distilled off to remove the dissolved hydrochloric acid and the excess chlorine. In order to combine the free hydrochloric acid present in the solution, acid-combining agents such as sodium carbonate or organic bases can be added at the time of separation, it being possible for these to be used as such or in the form of their aqueous solutions. The separation of the chlorination products can take place in various ways, e.g. by evaporating the solvents, by isolation on heated rollers or by introduction into hot water, the polymer remaining in the form of solid particles in the aqueous solution.

The products obtained can per se be used for many purposes, e.g. for the production of lacquers, synthetic plastics, foils, fibres, impregnations, etc. They show a good elasticity and, due to their uniform chlorination, an outstanding stability. Nevertheless, it is usually advisable to add to the chlorination products those stabilisers which are for example known for chlorinated rubber, polyvinyl chloride, etc.

By ethylene polymers, are understood here homopolymers or copolymers of ethylene, such as those obtained for example by polymerisation of ethylene under pressure, activated with oxygen-yielding agents or with free radical-forming substances, and also those polymers which are obtained without applying pressure or are obtained at low pressure using mixed catalysts based on organometallic compounds. Included herein are also the copolymers of ethylene—preferably such having a content of copolymerized ethylene of at least 70%—with other vinyl and vinylidene compounds, as for example propylene, vinyl chloride, vinylidene chloride, styrene, butadiene, acrylic acid esters etc., which copolymers are obtained by the said processes. If the mixture of a polyethylene of relatively low molecular weight and a polyethylene of higher molecular weight with the aforementioned intrinsic viscosities is replaced in the chlorination by a polyethylene which has the same intrinsic viscosity as the previously described mixtures of polyethylenes with different intrinsic viscosities, a chlorinated polyethylene is obtained which has less satisfactory film-forming properties.

Furthermore, the mixed chlorination products which are obtained by chlorinating solutions which contain other chlorinatable substances of high molecular weight, normally in proportions up to about 50%, in accordance with the present process, as well as the homopolymers or copolymers of ethylene, are likewise of industrial interest. As such substances, there are for example to be considered natural rubber and the homopolymers of propylene, butadiene, styrene, vinyl chloride, isobutylene, etc., as well as their copolymers. By this combined chlorination, it is possible to obtain valuable products of a novel character.

All these products are characterised by a high resistivity to chemical agents.

In accordance with the present process, it is especially possible to obtain chlorination products of polyethylene or of polyethylene mixtures which show from the outset a viscosity range which is particularly favourable for technical lacquer purposes.

The said product obtained by the process show very good elasticity and bonding strength when they are used as initial materials for lacquers. The films which can be obtained with such chlorination products also have a particularly good stability with respect to subsequent splitting-off of hydrochloric acid on account of their uniform chlorination. In addition, conventional stabilisers for splitting off hydrochloric acid, such as those used for chlorinated rubber and polyvinyl chloride, can be added to these chlorination products. Phenoxypropylene oxide, dibutyl-tin laurate and lead stearate are mentioned as examples of such stabilisers. It is also possible for the chlorination products obtainable according to the invention to be used for the production of foils, fibres and impregnations of every different types.

The parts indicated in the following examples are parts by weight, unless otherwise mentioned.

Example 1

70 parts of a polyethylene with an intrinsic viscosity of 0.25 and 30 parts of a polyethylene with an intrinsic viscosity of 0.74 are dissolved in 1300 parts of carbon tetrachloride and 300 parts of chloroform at 70° C. while stirring under reflux. 550 g. of chlorine are introduced into the solution thus obtained at the same temperature and the solution is thereafter cooled and further stirred for 24 hours at room temperature. In order to remove the excess chlorine and the dissolved hydrochloric acid, some of the solvent mixture is thereafter distilled off and the still hot solution is finally precipitated by dropping on to boiling water while stirring, the solvent being distilled off and the chlorinated polyethylene precipitating as solid white powder, which can easily be filtered and washed neutral. After drying at 80° C., a chlorination product of good solubility is obtained with a chlorine content of 68.7%.

Example 2

400 g. of chlorine are introduced at 70° C., into a solution consisting of 40 parts of a polyethylene with an intrinsic viscosity of 0.25 and 60 parts of a polyethylene with an intrinsic viscosity of 0.74 in 1300 parts of carbon tetrachloride and 300 parts of chloroform, prepared by the procedure described in Example 1. The procedure analogous to Example 1 is followed, but 2 parts of phenoxypropylene oxide are added to the solution prior to the precipitation. The chlorination product obtained in this way has a chlorine content of 61.8% after drying.

Example 3

2 parts of benzoyl peroxide are added to a solution of 85 parts of a polyethylene with an intrinsic viscosity of 0.25 and 15 parts of a polyethylene with an intrinsic viscosity of 0.74 in 1300 parts of carbon tetrachloride and 300 parts of chloroform and then 600 g. of chlorine are introduced into the solution at 70° C. The continued production takes place as in Example 1, but the isolation of the product is effected by introduction dropwise into methanol. The chlorination product has a chlorine content of 70.1% after drying.

Example 4

90 parts of a polyethylene with an intrinsic viscosity of 0.12 and 10 parts of a polyethylene with an intrinsic viscosity of 0.96 are chlorinated according to Example 1 until the chlorination product contains 64% of Cl. The product is characterised by good bonding strength, a DIN colour factor below 4 and good compatibility with long oil and medium oil linseed oil-alkyd resins.

Example 5

80 parts of a polyethylene with an intrinsic viscosity of 0.37 and 20 parts of a polyethylene with an intrinsic viscosity of 0.82 are chlorinated according to Example 1 until the chlorination product contains 67% of Cl. The product has excellent film-forming properties, a DIN colour factor below 4 and good compatibility with linseed oil.

Example 6

60 parts of a polyethylene with an intrinsic viscosity of 0.12 and 40 parts of a polyethylene with an intrinsic viscosity of 0.96 are chlorinated according to Example 1 until the chlorination product contains 62% of Cl. The product shows good bonding strength and a DIN colour factor below 4.

Example 7

55 parts of a polyethylene with an intrinsic viscosity of 0.37 and 45 parts of a polyethylene with an intrinsic viscosity of 0.82 are chlorinated according to Example 1, until the chlorination product contains 64% of Cl. The product has a good elasticity, a DIN colour factor below 4 and good compatibility with long oil and medium oil soya oil-alkyd resins.

Example 8

30 parts of a polyethylene with an intrinsic viscosity of 0.12 and 70 parts of a polyethylene with an intrinsic viscosity of 0.58 are chlorinated according to Example 1 until the chlorination product contains 64.5% of Cl. The product is characterised by good elasticity, a DIN colour factor below 4 and good compatibility with tall oil-alkyd resins.

Example 9

20 parts of a polyethylene with an intrinsic viscosity of 0.12 and 80 parts of a polyethylene of 0.58 are dissolved in 1600 parts of carbon tetrachloride at 75°. Chlorine is conducted over the solution at the same temperature and this is chlorinated according to Example 1 until the chlorination product contains 68% of Cl. The product has excellent film-forming properties and a DIN colour factor below 4.

Example 10

10 parts of a polyethylene with an intrinsic viscosity of 0.12 and 90 parts of a polyethylene with an intrinsic viscosity of 0.58 are dissolved while heating in 1500 parts of chlorobenzene. Chlorine is conducted over the solution at 130° C. and chlorination is carried out according to Example 3 until the chlorination product contains 72% of Cl. The DIN colour factor of the product is below 4.

What is claimed is:

1. A chlorinated polyethylene blend suitable for lacquers, which is prepared from a mixture of (A) 90–10 parts by weight of a polyethylene having an intrinsic viscosity of between 0.1 and 0.4 (dl./g.) and (B) 10–90 parts by weight of a polyethylene having an intrinsic viscosity of between 0.6 and 1.0 (dl./g.), the intrinsic viscosities of said polyethylenes (A) and (B) differing by at least 0.4 units, said mixture of polyethylenes being homogeneously chlorinated and containing 61.8 to 72% by weight of chlorine.

2. The chlorinated polyethylene blend of claim 1 wherein (A) is 70–40 parts by weight of a polyethylene having an intrinsic viscosity of between 0.2 and 0.3 (dl./g.) and (B) is 30–60 parts by weight of a polyethylene having an intrinsic viscosity of between 0.7 and 0.8 (dl./g.)

3. The chlorinated polyethylene blend of claim 1 wherein (A) is 70 parts by weight of a polyethylene with an intrinsic viscosity of 0.25 (dl./g.), (B) is 30 parts by weight of a polyethylene having an intrinsic viscosity of 0.74 and the chlorine content of said chlorinated mixture is 68.7%.

4. The chlorinated polyethylene blend of claim 1 wherein (A) is 90 parts by weight of a polyethylene with an intrinsic viscosity of 0.12 (dl./g.), (B) is 10 parts by weight of a polyethylene having an intrinsic viscosity of 0.96 and the chlorine content of said chlorinated mixture is 64%.

5. The chlorinated polyethylene blend of claim 1 wherein (A) is 55 parts by weight of a polyethylene with an intrinsic viscosity of 0.37 (dl./g.), (B) is 45 parts by weight of a polyethylene having an intrinsic viscosity of 0.82 and the chlorine content of said chlorinated mixture is 64%.

References Cited
UNITED STATES PATENTS

| | | | |
|---|---|---|---|
| 3,060,164 | 10/1962 | Canterino | 260—94.9 |
| 3,110,709 | 11/1963 | Canterino | 260—94.9 |
| 3,179,720 | 4/1965 | Hillmer | 260—897 |
| 3,260,694 | 7/1966 | Wang | 260—897 |

JOSEPH L. SCHOFER, *Primary Examiner.*

L. EDELMAN, *Assistant Examiner.*